May 12, 1953 T. W. TIZZARD, JR 2,638,536

FOUR-INDICATION SIGNAL CONTROL SYSTEM EMBODYING POLAR BIASED CODE FOLLOWING AND POLARIZED LINE RELAYS

Filed April 5, 1947 5 Sheets-Sheet 1

INVENTOR.
Thomas W. Tizzard Jr.
BY [signature]
HIS ATTORNEY

INVENTOR.
Thomas W. Tizzard Jr.
BY
HIS ATTORNEY

May 12, 1953 T. W. TIZZARD, JR 2,638,536
FOUR-INDICATION SIGNAL CONTROL SYSTEM EMBODYING POLAR
BIASED CODE FOLLOWING AND POLARIZED LINE RELAYS
Filed April 5, 1947 5 Sheets-Sheet 3

INVENTOR.
Thomas W. Tizzard Jr.
BY
HIS ATTORNEY

INVENTOR.
Thomas W. Tizzard Jr.
BY
[signature]
HIS ATTORNEY

May 12, 1953 T. W. TIZZARD, JR 2,638,536

FOUR-INDICATION SIGNAL CONTROL SYSTEM EMBODYING POLAR BIASED CODE FOLLOWING AND POLARIZED LINE RELAYS

Filed April 5, 1947 5 Sheets-Sheet 5

INVENTOR.
Thomas W. Tizzard Jr.
BY
HIS ATTORNEY

Patented May 12, 1953 2,638,536

UNITED STATES PATENT OFFICE 2,638,536

FOUR-INDICATION SIGNAL CONTROL SYSTEM EMBODYING POLAR BIASED CODE FOLLOWING AND POLARIZED LINE RELAYS

Thomas W. Tizzard, Jr., Downers Grove, Ill., assignor to Westinghouse Air Brake Company, a corporation of Pennsylvania Application April 5, 1947, Serial No. 739,694

10 Claims. (Cl. 246—46)

My invention relates to a railway signaling system, and particularly to a railway signaling system for a stretch of railway track which is divided into a plurality of successive blocks, and for which there is a plurality of signals spaced along the stretch of track for governing traffic movements through these blocks.

In railway signaling systems of this type, one common practice is to control each signal by a polarized line relay to display a proceed or a caution or a stop indication according to traffic conditions in the first two blocks in advance of the signal.

One feature of my invention is the provision of a polar biased code following line relay in addition to a polarized line relay for each signal, and of means for at times energizing both of these relays by steady current of normal polarity and for at other times energizing these relays by steady or periodically interrupted current of reverse polarity for controlling each signal to display a medium speed indication in addition to the proceed, caution and stop indications, according to traffic conditions in the first three blocks in advance of each signal.

I shall describe two forms of apparatus embodying my invention, and shall then point out the novel features thereof in claims.

Figure 1A:
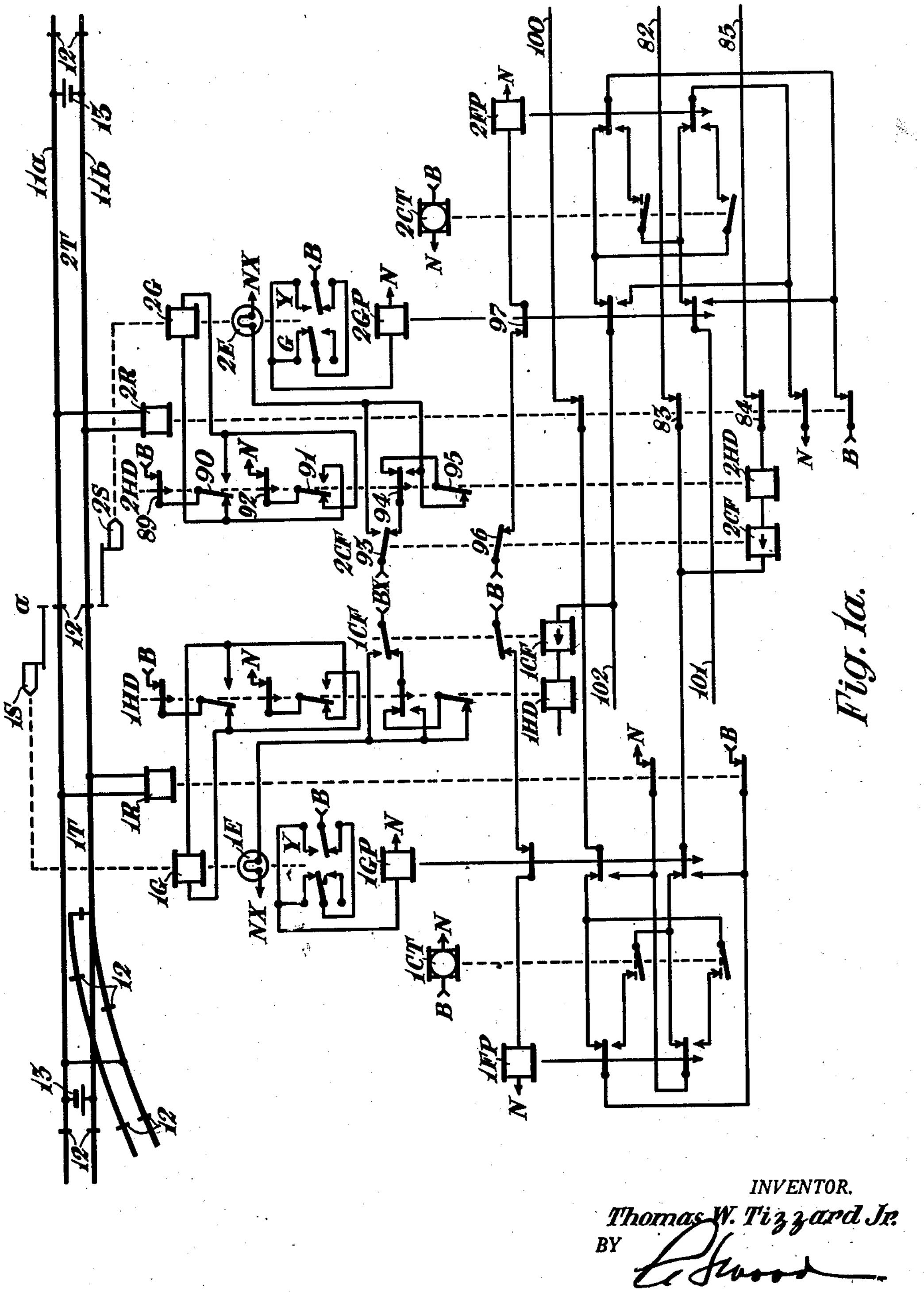
Figure 1B:
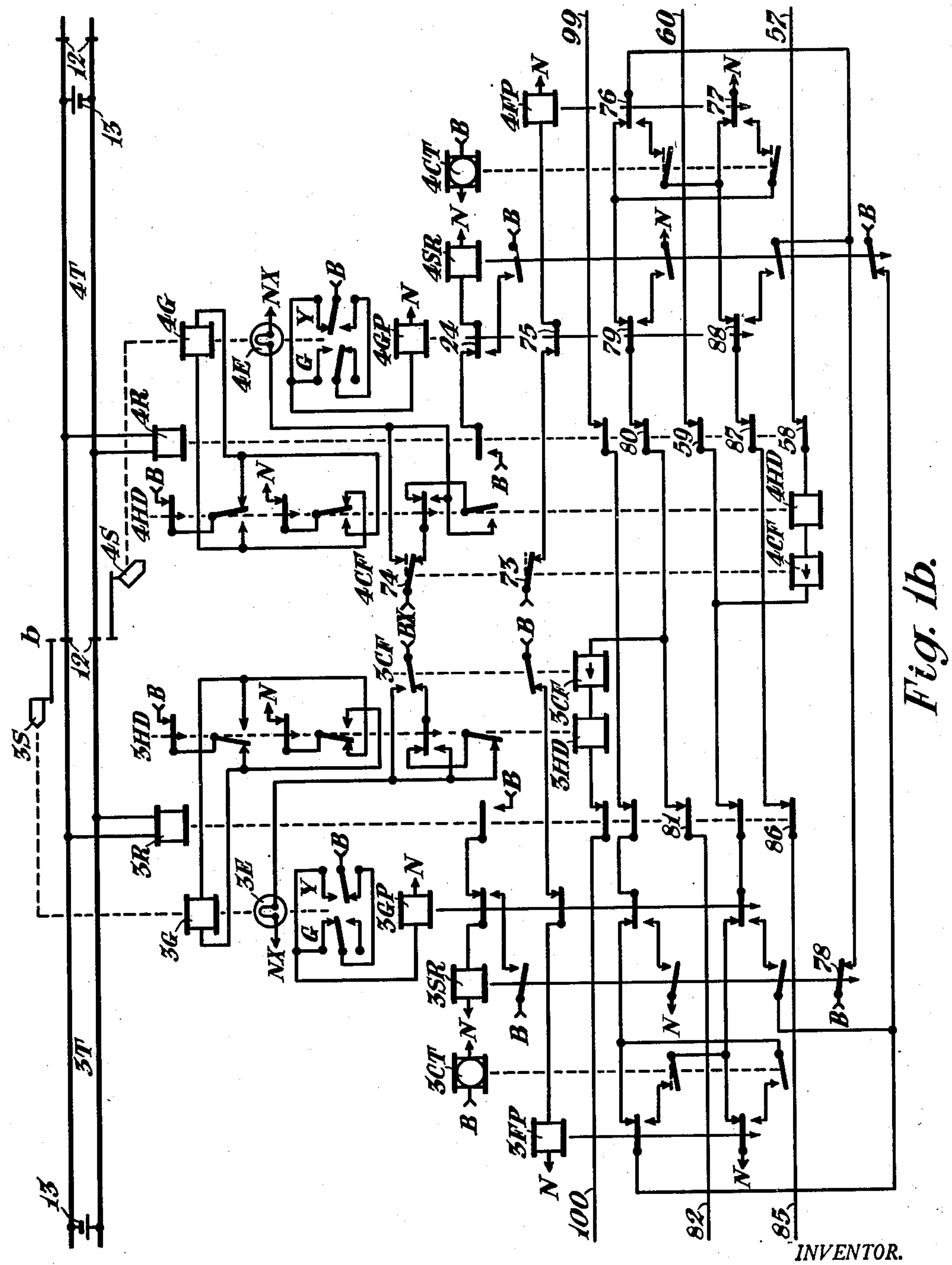
Figure 1C:
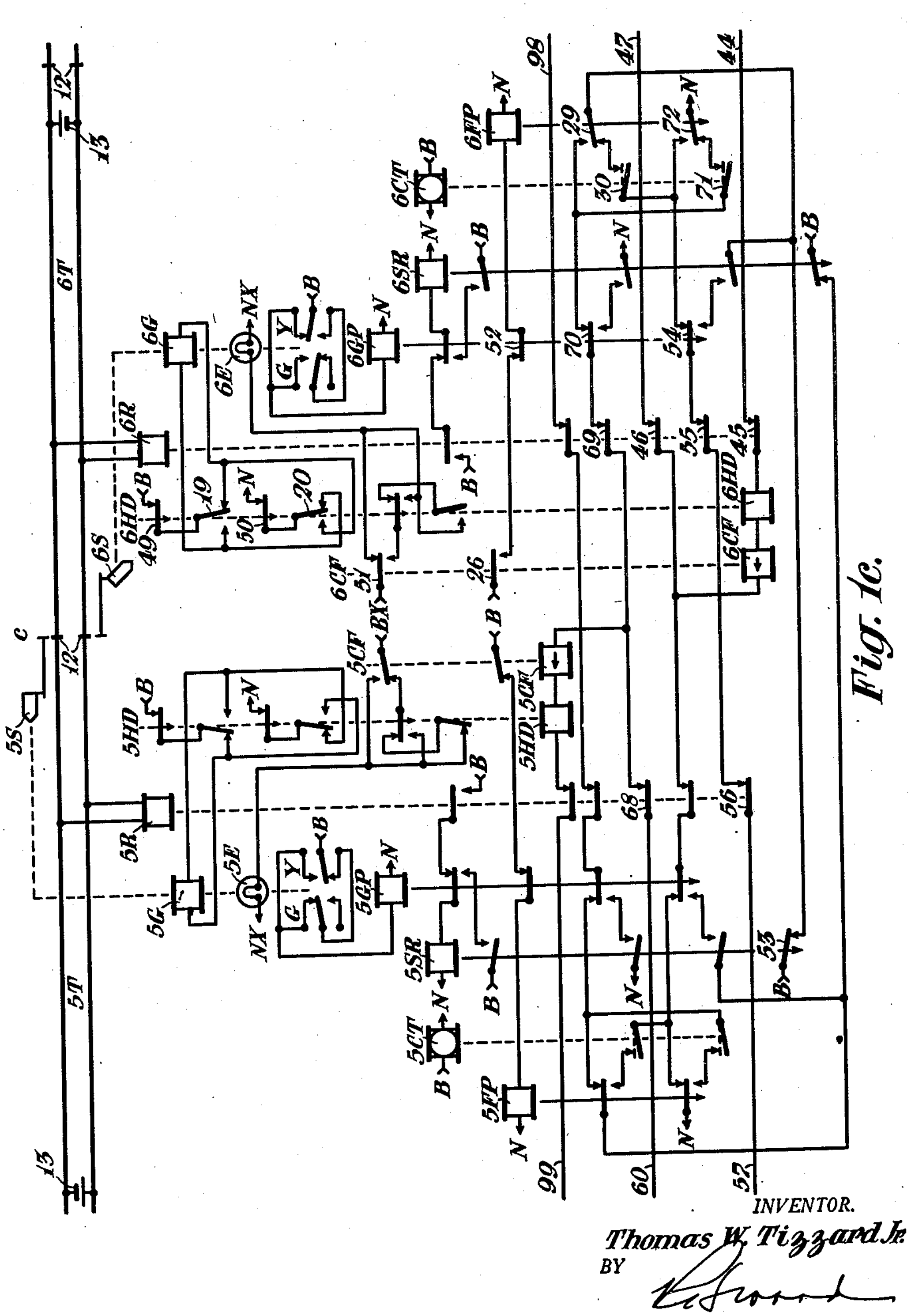

In the accompanying drawings, Figs. 1*a*, 1*b*, 1c and 1*d* when placed end to end in the order named, with Fig. 1*a* on the left, constitute a diagrammatic view showing one form of apparatus embodying my invention for controlling signals of the searchlight type to display a flashing yellow light as the medium speed indication in addition to steady green, steady yellow and steady red lights for the other indications. Fig. 2 is a diagrammatic view showing a modification of a portion of the apparatus shown in Figs. 1*a*, 1*b*, 1c and 1*d* for controlling signals of the color light type to display a flashing yellow light as the medium speed indication in addition to the other indications, and also embodying my invention.

Similar reference characters refer to similar parts in each of the views.

Referring first to Figs. 1*a*, 1*b*, 1c and 1*d*, the reference characters 11*a* and 11*b* designate the rails of a stretch of railway track over which traffic may move in both directions. I shall assume that the direction toward the right, as shown in the drawings, is eastbound, whereas the opposite direction, toward the left, is westbound.

Rails 11*a* and 11*b* are divided by insulated joints 12 into blocks *a—b*, *b—c*, *c—d* and *d—e*. Each of these blocks is further divided by other insulated joints 12 into two sections. Block *a—b*, for example, is divided into sections 2T and 3T. Each track section is provided with a track circuit including a suitable source of current, such for example as a battery 13, connected across the rails adjacent one end of the section, and a track relay, designated by the reference character R with a numerical prefix which is the same as that in the reference character for the associated section.

Signals, designated by the reference characters 1S, 3S, 5S, 7S and 9S, are shown adjacent points *a*, *b*, *c*, *d* and *e*, respectively, for governing westbound traffic movements, and signals, designated by the reference characters 2S, 4S, 6S, 8S and 10S, are shown adjacent points *a*, *b*, *c*, *d* and *e*, respectively, for governing eastbound traffic movements. Although it is assumed that the signals are of the searchlight type, such as shown for example, in Letters Patent of the United States, No. 1,864,224, granted June 21, 1932, to W. B. Wells, for Light Signals, it is to be understood that my invention is not limited to signals of this type.

A slow release polarized line relay, designated by the reference character HD with a numerical prefix which is the same as that in the reference character for the associated signal, and a polar biased code following relay, designated by the reference character CF with a numerical prefix which is also the same as that in the reference character for the associated signal, are provided for each signal.

Each searchlight signal mechanism comprises a polarized winding and a lamp, such as 1G and 1E, each identified by a numerical prefix which is the same as that for the associated signal. Each winding operates a contact G or Y depending upon the relative polarity of the current supplied thereto, and also operates a movable spectacle located in front of the lamp, to cause the signal to display different colors.

The mechanism of each signal is controlled by the associated HD relay, so that when the relay is energized in the normal direction, with its left-hand polar contacts closed, the mechanism assumes its proceed position, closing its front contact G and displaying a green light. When relay HD is energized in the reverse direction, the mechanism assumes its caution position, closing its front contact Y and displaying a yellow light. When relay HD is deenergized the signal mechanism is also deenergized, both back contacts are closed, and the signal then indicates stop by the display of a red light. The circuit for the lamp E of each signal is controlled by both the associated HD and CF relays in such manner as to enable either a steady or a flashing yellow light to be displayed.

Each of the CF relays, when energized by current flowing through its winding in the direction indicated by the arrow shown in its symbol, closes its front contacts. When each CF relay is deenergized, or when it is energized by current flowing in the opposite direction, its back contacts become closed.

A signal repeater relay, designated by the reference character GP with a numerical prefix which is the same as that for the associated signal, is provided for each signal, and is controlled by the mechanism of its signal so that each relay GP is energized when its signal is displaying a green or yellow light.

A second signal repeater relay for each signal is designated by the reference character FP with a numerical prefix which is the same as the number in the reference character for its signal. Each of the second signal repeater relays is controlled by a front contact of the first signal repeater relay for the same signal and by a back contact of the polar biased code following relay for the same signal.

A code transmitting device for each signal is designated by the reference character CT with a numerical prefix which is the same as the number in the reference character for its signal. Each of these code transmitters is constantly energized, and therefore repeatedly closes and opens its contacts.

A directional stick relay, designated by the reference character SR with a numerical prefix which is the same as the number in the reference character for its signal, is shown for each of the signals 3S, 4S, 5S, 6S, 7S and 8S.

Figure 1D:
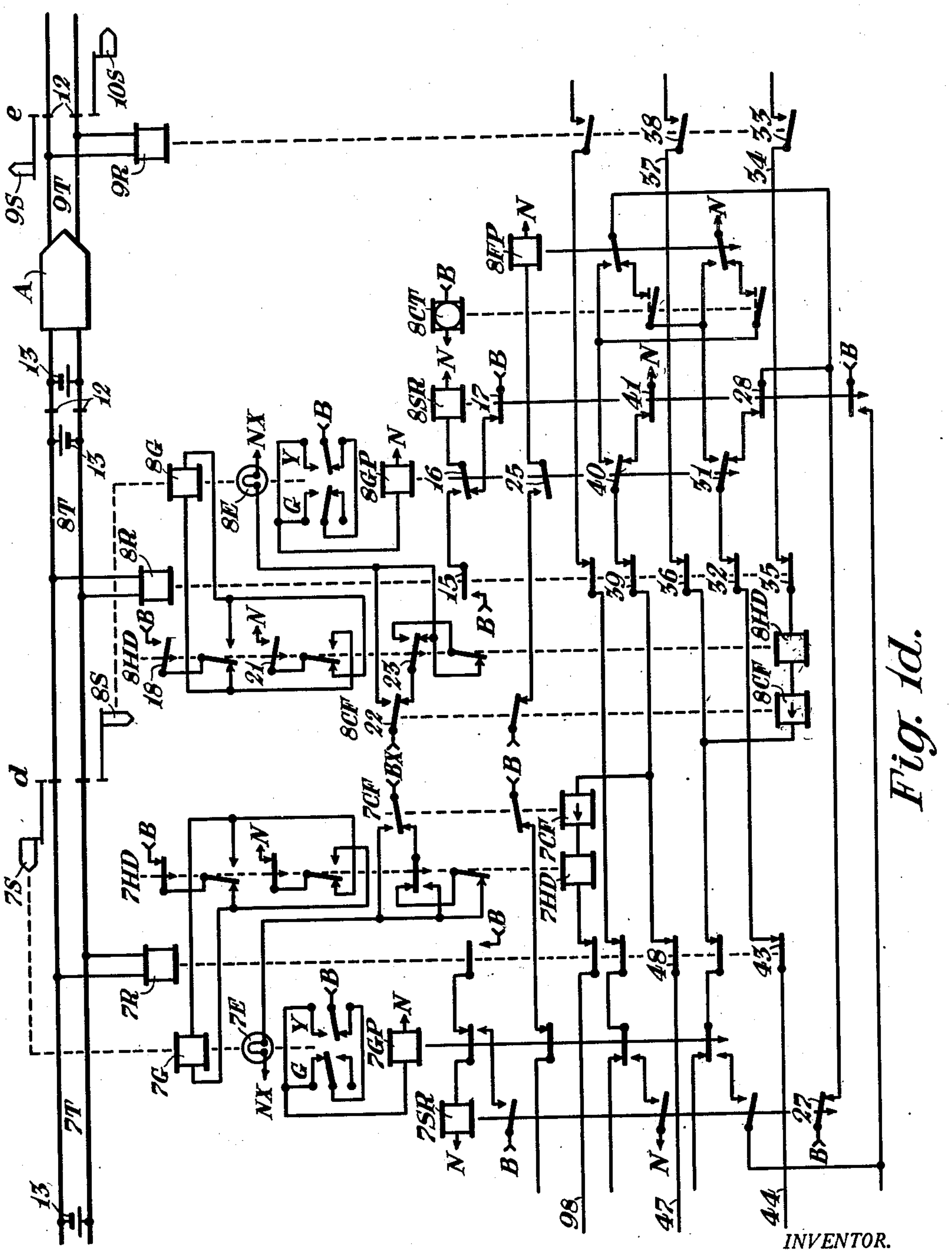
Figure 2:
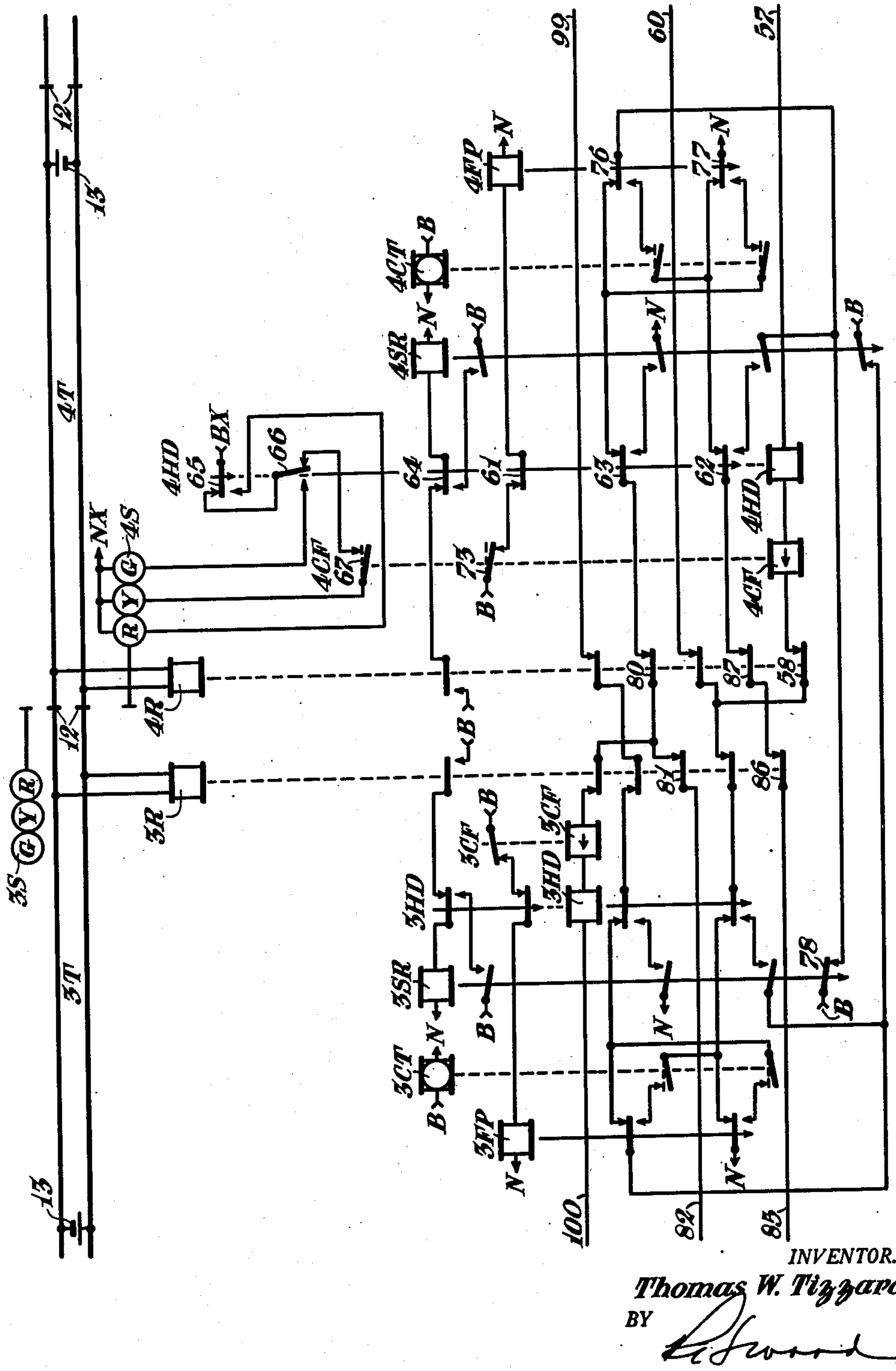

As shown in Fig. 1*d*, section 9T is occupied by an eastbound train A. The meanings of the indications displayed by each of the signals 2S, 4S, 6S and 8S, when train A is located as shown, are given in the following table:

| Signal | Indication Displayed | Meaning of Indication |
|---|---|---|
| 2S | Steady green | First three blocks in advance of signal 2S are clear. |
| 4S | Flashing yellow | First two blocks in advance are clear, but third block is occupied. |
| 6S | Steady yellow | First block in advance is clear, but second block is occupied. |
| 8S | Steady red | First block in advance of signal 8S is occupied. |

I shall now describe the manner in which these indications are controlled to be displayed under the conditions shown in the drawings.

With train A occupying section 9T, track relay 9R is deenergized, and hence the line circuit including contacts 33 and 38 of relay 9R, the line wires 34 and 37, and contacts 35 and 36 of relay 8R for energizing relays 8HD and 8CF is open. Relays 8HD and 8CF are therefore deenergized.

With relay 8HD deenergized, its front contacts 18 and 21 are open in the operating circuit for mechanism 8G of signal 8S, and hence signal 8S is in its stop position. With relays 8CF and 8HD deenergized, lamp 8E of signal 8S is lighted, for displaying a steady red indication, by a circuit passing from terminal BX of a suitable source of current, through the back point of contact 22 of relay 8CF, back point of contact 23 of relay 8HD, and lamp 8E to terminal NX of the same source of current.

With mechanism 8G in the stop position, the first signal repeater relay 8GP is deenergized. With relay 8GP deenergized, its contact 25 is open, and hence the second signal repeater relay 8FP is also deenergized.

It is assumed that when train A entered section 8T, relay 8HD was energized in the normal direction and mechanism 8G was in the proceed position, and that when the train released the track relay 8R, relay 8SR became energized by a circuit passing from terminal B of a suitable source of current, through contact 15 of relay 8R, front point of contact 16 of relay 8GP, and the winding of relay 8SR to terminal N of the same source of current.

When the train entered section 8T, contacts 35 and 36 of relay 8R opened the circuit for relays 8CF and 8HD, causing these relays to become deenergized. Contacts 18 and 21 of relay 8HD then opened the circuit for mechanism 8G, causing it to move to the stop position.

Relay 8GP then became deenergized and completed a stick circuit for relay 8SR, passing from terminal B, through contact 17 of relay 8SR, back point of contact 16 of relay 8GP, and the winding of relay 8SR to terminal N. Relay 8SR will thus remain energized as long as relay 8GP is deenergized on account of the mechanism of signal 8S occupying the stop position.

Relay 7SR is controlled for westbound traffic movements similarly to the manner in which relay 8SR is controlled for eastbound traffic movements, and is therefore now deenergized.

With relays 7SR and 8GP deenergized and relay 8SR energized, a circuit is completed for energizing relays 6HD and 6CF by steady current of reverse polarity, this circuit passing from terminal B, through contact 27 of relay 7SR, contact 28 of relay 8SR, back point of contact 31 of relay 8GP, contact 32 of relay 8R, contact 43 of relay 7R, line conductor 44, contact 45 of relay 6R, windings of relays 6CF and 6HD, contact 46 of relay 6R, line conductor 47, contacts 48 and 39 of relays 7R and 8R, respectively, back point of contact 40 of relay 8GP, and contact 41 of relay 8SR to terminal N.

With relay 6HD energized by current of reverse polarity, its polar contacts 19 and 20 are closed in the reverse position, thereby completing a circuit for energizing the mechanism 6G in the reverse direction, this circuit passing from terminal B, through contact 49 of relay 6HD, contact 19 of relay 6HD closed in the reverse position, the winding of mechanism 6G, contact 20 of relay 6HD closed in the reverse position, and contact 50 of relay 6HD to terminal N.

With relay 6CF energized by current of reverse polarity which flows in the direction indicated by the arrow in its symbol, its contact 51 is closed at the front point, and therefore lamp 6E of signal 6S is steadily lighted by a circuit passing from terminal BX, through the front point of contact 51 of relay 6CF, and lamp 6E to terminal NX. With mechanism 6G of signal 6S thus in the caution position, and with its lamp steadily lighted, signal 6S is displaying a steady yellow indication.

With mechanism 6G in the caution position, its front contact Y is closed, thereby completing a circuit for energizing relay 6GP. With relay 6CF energized by current of reverse polarity, its contact 26 is open, so that, although contact 52 of point of contact 65 of relay 4HD, contact 66 of relay 4HD closed in the reverse position, contact 67 of relay 4CF, and lamp Y of signal 4S to terminal NX.

Contacts 62 and 63 of relay 4HD are here included in the control circuits for relays 2HD and 2CF instead of contacts 88 and 79 of relay 4GP, shown in Fig. 1*b*. Also, contact 64 of relay 4HD is here included in the circuit for relay 4SR instead of contact 24 of relay 4GP shown in Fig. 1*b*.

If relays 4HD and 4CF were steadily energized by current of reverse polarity, as shown for relays 6HD and 6CF in Fig. 1*c*, contact 67 of relay 4CF would be constantly closed, and hence signal 4S would then display a steady yellow indication.

If relay 4HD were deenergized, as is relay 8HD in Fig. 1*d*, lamp R of signal 4S would be energized for displaying a steady red indication by a circuit passing from terminal BX, through the back point of contact 65 of relay 4HD, and lamp R to terminal NX.

If relays 4HD and 4CF were energized by current of normal polarity, as shown for relays 2HD and 2CF in Fig. 1*a*, lamp G of signal 4S would be lighted to display a steady green indication by a circuit passing from terminal BX, through the front point of contact 65 of relay 4HD, contact 66 of relay 4HD closed in the normal position, and lamp G of signal 4S to terminal NX.

It will be noted that with apparatus embodying my invention, as shown in Fig. 1*c*, for example, only three line conductors are required between opposing signals for governing traffic movements into the opposite ends of each block.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a stretch of railway track divided into three successive blocks, a signal adjacent one end of said stretch for governing traffic movements over said stretch, a slow release polarized relay, a polar biased code following relay, means controlled by traffic conditions for energizing said relays by constant current of normal polarity when said three blocks are unoccupied and for energizing said relays by periodically interrupted current of reverse polarity when the first two blocks in advance of said signal are unoccupied while the third block is occupied and also for energizing said relays by constant current of reverse polarity when the first block in advance of said signal is unoccupied while the second block is occupied but said means ineffective to energize said relays if the first block in advance of said signal is occupied, and means controlled by said relays when energized by current of normal polarity for controlling said signal to display a high speed indication and when energized by periodically interrupted current of reverse polarity for controlling said signal to display a medium speed indication and also when energized by constant current of reverse polarity for controlling said signal to display a low speed indication and when deenergized for controlling said signal to display a stop indication.

2. In combination, a stretch of railway track divided into three successive blocks, a signal adjacent one end of said stretch for governing traffic movements over said stretch, a slow release polarized relay having neutral and polar contacts and responsive to current of normal and reverse polarity for closing said neutral contacts and said normal and reverse polar contacts respectively, a polar biased code following relay having front contacts which it closes in response to current of reverse polarity and having back contacts which become closed if said polar biased code following relay is energized by current of normal polarity or is deenergized, means controlled by traffic conditions in said three blocks for energizing said relays by constant current of normal polarity or by periodically interrupted current of reverse polarity or by constant current of reverse polarity according as all said three blocks are unoccupied or the first two blocks in advance of said signal are unoccupied while the third block is occupied or the first block in advance of said signal is unoccupied while the second block is occupied but ineffective to energize said relays if said first block is occupied, a circuit controlled by a neutral contact and a normal polar contact of said polarized relay for controlling said signal to display a constant green indication, a second circuit controlled by a neutral contact and a reverse polar contact of said polarized relay for controlling said signal to display a yellow indication, means including a front contact of said polar biased relay for controlling said signal to display a flashing yellow indication or a constant yellow indication according as said relays are energized by periodically interrupted or constant current of reverse polarity, and a third circuit controlled by a neutral contact of said polarized relay for controlling said signal to display a constant red indication when said polarized relay is deenergized.

3. In a railway signaling system in which a stretch of railway track is divided into a plurality of successive blocks and in which there is a plurality of signals for governing traffic movements in a given direction over said stretch one for each of said blocks, the combination comprising, a polarized relay and a polar biased code following relay for each of said signals, a first signal repeater relay for each of said signals each energized if its signal is controlled to display an indication other than stop, a back contact of each of said polar biased code following relays each closed if its relay is deenergized or is energized by current of normal polarity, a second signal repeater relay for each of said signals each controlled by a front contact of the first signal repeater relay for its signal and by a back contact of the polar biased code following relay for its signal, a code transmitter for each of said signals, and circuits for the polarized and polar biased relays for each signal controlled by a front contact of a track relay for the first block in advance of their signal and by the first and second signal repeater relays and the code transmitter for the signal for the second block in advance of their signal for energizing said polarized and polar biased relays by constant current of normal polarity or by periodically interrupted or constant current of reverse polarity for controlling the associated signal to display a first or a second or a third indication respectively other than stop, according as the first three blocks in advance of the associated signal are unoccupied or the first two blocks in advance of the associated signal are unoccupied while the third block is occupied or the first block in advance of the associated signal is unoccupied while the second block is occupied respectively.

relay 6GP is now closed, relay 6FP remains deenergized.

With relays 5SR and 6FP deenergized, and with relay 6GP energized, a circuit is closed for periodically energizing relays 4HD and 4CF by current of reverse polarity, this circuit passing from terminal B, through contact 53 of relay 5SR, back point of contact 29 of relay 6FP, contact 30 of code transmitter 6CT, front point of contact 54 of relay 6GP, contacts 55 and 56 of relays 6R and 5R, respectively, line conductor 57, contact 58 of relay 4R, windings of relays 4CF and 4HD, contact 59 of relay 4R, line conductor 60, contacts 68 and 69 of relays 5R and 6R, respectively, front point of contact 70 of relay 6GP, contact 71 of code transmitter 6CT, and the back point of contact 72 of relay 6FP to terminal N. Since relay 4CF is now periodically energized by current of reverse polarity, and since this relay is of the code following type, its contact 73 repeatedly opens and closes.

Relay 4HD also is energized by periodically interrupted current of reverse polarity, but this relay is of the slow release type, and therefore its neutral front contacts remain closed during the open periods of the energizing circuit for relays 4CF and 4HD, and hence the mechanism 4G of signal 4S is constantly energized in the reverse direction of a circuit which is similar to that previously traced for the mechanism 6G. Relay 4GP is therefore energized by a circuit similar to the circuit traced for relay 6GP. It should be particularly pointed out that, while the HD relays are shown in the drawings as being slow releasing because, with the particular type of quick acting signal mechanism shown, it is desirable that the HD relays be slow releasing to avoid undesirable oscillation of the signal mechanism when the line circuit is being coded, my invention is not limited to the use of slow releasing relays. With other types of signals, such for example as a searchlight signal having a slow acting mechanism, it would be possible to employ ordinary acting HD relays, as is well understood in the railway signaling art.

Since relay 4CF is periodically energized, its contact 74 repeatedly closes and opens at its front point, and hence lamp 4E of signal 4S is energized by a circuit for causing lamp 4E to display a flashing yellow indication, this circuit passing from terminal BX, through the front point of contact 74 of relay 4CF, and lamp 4E to terminal NX.

With relay 4GP energized, and with contact 73 of relay 4CF repeatedly closed, a circuit is periodically completed for energizing relay 4FP, this circuit passing from terminal B, through contact 73 of relay 4CF, contact 75 of relay 4GP, and the winding of relay 4FP to terminal N. Relay 4FP, being of the slow releasing type, retains its contacts 76 and 77 closed at the front points during the open periods of the circuit for relay 4FP.

With contacts 76 and 77 of relay 4FP constantly closed at their front points, and with relay 4GP energized, a circuit is completed for constantly energizing relays 2HD and 2CF by current of normal polarity, this circuit passing from terminal B, through contact 78 of relay 3SR, front point of contact 76 of relay 4FP, front point of contact 79 of relay 4GP, contacts 80 and 81 of relays 4R and 3R, respectively, line conductor 82, contact 83 of relay 2R, windings of relays 2HD and 2CF, contact 84 of relay 2R, line conductor 85, contacts 86 and 87 of relays 3R and 4R, respectively, front point of contact 88 of relay 4GP, and the front point of contact 77 of relay 4FP to terminal N. With relay 2CF now energized by current of normal polarity, which is in the direction opposite to the arrow in its symbol, its back contacts remain closed.

With relay 2HD energized by current of normal polarity, mechanism 2G of signal 2S is energized in the normal direction by a circuit passing from terminal B, through contact 89 of relay 2HD, contact 90 of relay 2HD closed in the normal position, the winding of mechanism 2G, contact 91 of relay 2HD closed in the normal position, and contact 92 of relay 2HD, to terminal N. Mechanism 2G of signal 2S therefore occupies the proceed position.

Lamp 2E of signal 2S is therefore lighted to display a steady green indication, by a circuit passing from terminal BX, through back point of contact 93 of relay 2CF, front point of contact 94 of relay 2HD, contact 95 of relay 2HD, and lamp 2E to terminal NX. With mechanism 2G of signal 2S in the proceed position, its front contact G is closed, and hence relay 2GP is energized. Relay 2FP is constantly energized by a circuit passing from terminal B, through contacts 96 and 97 of relays 2CF and 2GP, respectively, and the winding of relay 2FP to terminal N.

With relays 2FP and 2GP energized, the front points of the contacts of these relays are closed in a circuit including the line conductors 101 and 102, for controlling the next eastbound signal west of signal 2S. The circuit for this next eastbound signal includes front contacts of relay 2R instead of a back contact of a directional stick relay.

Relays 5CF and 5HD for westbound signal 5S are energized over the line conductors 60 and 99, and relays 7CF and 7HD for westbound signal 7S, are energized over the line conductors 47 and 98, by circuits which are similar to those traced for relays 2HD and 2CF for eastbound signal 2S. Relays 3CF and 3HD for signal 3S are energized over the line conductors 82 and 100 by a circuit similar to that for relays 2HD and 2CF except that it includes front contacts of track relay 1R instead of a back contact of a directional stick relay.

Referring now to Fig. 2, the signals in this form of apparatus, being of the color light type, have no operating mechanism, and therefore the first signal repeater relay 4GP, shown in Fig. 1*b*, is here omitted. Relay 4FP is here controlled by a front contact of relay 4HD instead of by a front contact of relay 4GP. Also, relay 4SR is here controlled by a contact of relay 4HD instead of by a contact of relay 4GP as in Fig. 1*b*.

Under the same set of traffic conditions as assumed in the foregoing description, but with Fig. 2 substituted for Fig. 1*b* and with a train occupying section 9T, relays 4HD and 4CF of Fig. 2 are periodically energized by current of reverse polarity. Relay 4FP is therefore periodically energized by a circuit passing from terminal B, through contact 73 of relay 4CF, contact 61 of relay 4HD, and the winding of relay 4FP, to terminal N. Relay 4FP, however, being of the slow releasing type, retains its contacts 76 and 77 closed at their front points during the open periods of its control circuit. Since relay 4CF is of the code following type, its contact 67 periodically closes and opens, and hence a circuit is completed for lighting lamp Y of signal 4S to display a flashing yellow indication, this circuit passing from terminal BX, through the front 4. In a railway signaling system in which a stretch of railway track is divided into a plurality of successive blocks and in which there is a plurality of signals for governing traffic movements in a given direction over said stretch one for each of said blocks, the combination comprising, a polarized relay and a polar biased code following relay for each of said signals, a first signal repeater relay for each of said signals each energized if its signal is controlled to display an indication other than stop, a back contact of each of said polar biased code following relays each closed if its relay is deenergized or is energized by current of normal polarity, a second signal repeater relay for each of said signals each controlled by a front contact of the first signal repeater relay for its signal and by a back contact of the polar biased code following relay for its signal, a code transmitter for each signal, a directional stick relay for each signal, means responsive to a train moving in the direction governed by each signal for energizing the corresponding directional stick relay by a pick-up circuit when the train enters the block for the signal and for then retaining the stick relay energized by a stick circuit while the train occupies the block for the signal, and circuits for the polarized and polar biased relays for each signal controlled by the first and second signal repeater relays and the code transmitter and the directional stick relay for the signal for the second block in advance of their signal for energizing said polarized and polar biased relays by steady current of normal polarity when the first three blocks in advance of the corresponding signal are unoccupied and by steady and periodically interrupted current of reverse polarity when the second or third block respectively in advance of the corresponding signal is occupied while the first block is unoccupied for controlling their signal.

5. In combination, a stretch of railway track divided into three successive blocks, a signal adjacent one end of said stretch for governing traffic movements over said stretch, a polarized relay, a polar biased code following relay, traffic responsive means for each of said blocks, means controlled by said traffic responsive means for energizing said relays in series by constant current of normal polarity when said three blocks are unoccupied and for energizing said relays in series by periodically interrupted current of reverse polarity when the first two blocks in advance of said signal are unoccupied while the third block is occupied and also for energizing said relays in series by constant current of reverse polarity when the first block in advance of said signal is unoccupied while the second block is occupied but said means ineffective to energize said relays if the first block in advance of said signal is occupied, and means controlled by said relays when energized by current of normal polarity for controlling said signal to display a high speed indication and when energized by periodically interrupted current of reverse polarity for controlling said signal to display a medium speed indication and also when energized by constant current of reverse polarity for controlling said signal to display a low speed indication and when deenergized for controlling said signal to display a stop indication.

6. In combination, a stretch of railway track divided into three successive blocks, a signal adjacent one end of said stretch for governing traffic movements over said stretch, a polarized relay and a polar biased code following relay, traffic responsive means for each of said blocks, a slow release relay, a control circuit controlled by said traffic responsive means for the second block in advance of said signal for energizing said slow release relay only while said second block is unoccupied, a directional stick relay, a pick-up circuit for said directional stick relay controlled by a front contact of said slow release relay and by the traffic responsive means for said second block in advance of said signal for energizing said directional stick relay when a train enters said second block from the first block in advance of said signal, a stick circuit for said directional stick relay controlled by a back contact of said slow release relay, means controlled by said traffic responsive means for said three blocks in advance of said signal for energizing said polarized and polar biased code following relays by steady current of normal polarity only while all three of said blocks are unoccupied, a code transmitter, means controlled by said code transmitter and by said traffic responsive means for said three blocks for energizing said polarized relay and said polar biased code following relay by periodically interrupted current of reverse polarity only while the first and second blocks in advance of said signal are unoccupied and the third block is occupied, means controlled by said traffic responsive means for said first and second blocks in advance of said signal and by said directional stick relay for energizing said polarized and polar biased code following relays by steady current of reverse polarity only while said first block is unoccupied and said second block is occupied, and means controlled by said polarized and polar biased relays for controlling said signal to display a stop indication if the first block in advance of said signal is occupied and to display a low speed indication if said first block is unoccupied but the second block in advance of said signal is occupied and also to display a medium speed indication if said first and second blocks are unoccupied but the third block in advance of said signal is occupied and to display a high speed indication if all said three blocks are unoccupied.

7. In combination, a stretch of railway track divided into three successive blocks, a signal adjacent one end of said stretch for governing traffic movements over said stretch, a slow release polarized relay, a polar biased code following relay, traffic responsive means for each of said blocks each operative to close front contacts when its block is unoccupied and to close back contacts when its block is occupied, a slow release relay, a control circuit including means controlled by a front contact of said traffic responsive means for the second block in advance of said signal for energizing said slow release relay, a directional stick relay, a pick-up circuit for said directional stick relay controlled by a front contact of said slow release relay and by a back contact of the traffic responsive means for said second block in advance, a stick circuit for said directional stick relay controlled by a back contact of said slow release relay, a normal control circuit for energizing said polarized and polar biased code following relays by steady current of normal polarity to which said polarized relay responds by closing front neutral and normal polar contacts and to which said polar biased code following relay responds by closing back contacts, said normal control circuit controlled by means including front contacts of said traffic responsive means for said three blocks in advance, a code transmitting device, a coded reverse control circuit for energizing said polarized and polar biased code following relays by coded current of reverse polarity to which the polarized relay responds by holding front neutral and reverse polar contacts constantly closed and to which said polar biased code following relay responds by periodically opening its back contacts and closing a front contact, said coded reverse control circuit including means controlled by said code transmitter and by a front contact of said slow release relay and by a front contact of said traffic responsive means for said first block, a steady reverse control circuit for energizing said polarized and polar biased code following relays by steady current of reverse polarity to which said polarized relay responds by holding its front and reverse polar contacts constantly closed and to which said polar biased code following relay responds by holding its front contact constantly closed, said steady reverse control circuit including means controlled by a back contact of said slow release relay and by a front contact of said directional stick relay and by a front contact of said traffic responsive means for said first block, means controlled by said polarized and polar biased code following relays upon becoming energized by said normal control circuit and by said coded and steady reverse control circuits for controlling said signal to display a proceed or a medium speed or a caution indication respectively, and means for controlling said signal to display a stop indication if said polarized and polar biased code following relays are deenergized.

8. In combination, a stretch of railway track divided into three successive blocks, a signal adjacent one end of said stretch for governing traffic movements over said stretch, a polarized relay, a polar biased code following relay constructed to close front contacts when energized by current of reverse polarity and to close back contacts when deenergized or when energized by current of normal polarity, a track circuit for each of said blocks each including a track relay, a slow release relay, means controlled by a front contact of the track relay for the second block in advance of said signal for energizing said slow release relay, a directional stick relay, a pick-up circuit for said directional stick relay controlled by a front contact of said slow release relay and by a back contact of the track relay for the second block in advance of said signal, a stick circuit for said stick relay controlled by a back contact of said slow release relay, means controlled by front contacts of the track relays for said three blocks for energizing said polarized and polar biased code following relays by steady current of normal polarity, a coding device, means controlled by said coding device and by said track relays for energizing said polarized and polar biased code following relays by periodically interrupted current of reverse polarity while the first and second blocks in advance of said signal are unoccupied and the third block is occupied, means controlled by said track relays for said first and second blocks and by said directional stick relay for energizing said polarized and polar biased code following relays by steady current of reverse polarity while said first block is unoccupied and said second block is occupied, and means controlled by said polarized and polar biased code following relays when energized by current of normal polarity for controlling said signal to display a high speed indication and when energized by periodically interrupted current of reverse polarity for controlling said signal to display a medium speed indication and also when energized by steady current of reverse polarity for controlling said signal to display a low speed indication and when deenergized for controlling said signal to display a stop indication.

9. In a railway signaling system in which a stretch of railway track is divided into a plurality of successive blocks and in which there is a plurality of signals for governing traffic movements in a given direction over said stretch one for each of said blocks, the combination comprising, a polarized relay and a polar biased code following relay for each of said signals, a signal repeater relay for each of said signals each energized if its signal is controlled to display an indication other than stop, a back contact of each of said polar biased code following relays each closed if its relay is deenergized or is energized by current of normal polarity, a second signal repeater relay for each of said signals each controlled by a front contact of the first signal repeater relay for its signal and by a back contact of the polar biased code following relay for its signal, a code transmitter for each signal, and circuits for the polarized and polar biased relays for each signal controlled by a track relay for the first block in advance of their signal and by the first and second signal repeater relays and the code transmitter for the signal for the second block in advance of their signal for energizing said polarized and polar biased relays by constant current of normal polarity or by periodically interrupted or constant current of reverse polarity for controlling the associated signal to display a high speed indication or a medium or a low speed indication respectively according as the first three blocks in advance of the associated signal are unoccupied or the first two blocks in advance of the associated signal are unoccupied while the third block is occupied or the first block in advance of the associated signal is unoccupied while the second block is occupied respectively.

10. In a railway signaling system in which a stretch of railway track is divided into a plurality of successive blocks having a plurality of signals one for each of said blocks for governing traffic movements in a given direction over said stretch and having traffic responsive means for each of said blocks each operative to close front contacts when its block is unoccupied and to close back contacts when its block is occupied, the combination comprising, a plurality of polarized relays one for each of said signals each having front and back neutral contacts and normal and reverse polar contacts, a plurality of polar biased code following relays one for each of said signals each having a front contact which becomes closed when its relay is energized by current of reverse polarity and having back contacts which become closed when the relay is deenergized or is energized by current of normal polarity, a first repeater relay for each of said signals, means for energizing each of said first repeater relays if its signal is controlled to display an indication other than stop, a second repeater relay for each of said signals, a control circuit for each of said second repeater relays each controlled by a front contact of the first repeater relay and by a back contact of the polar biased code following relay for its signal, a code transmitter for each signal each constantly operated for periodically closing and opening coding contacts, a directional stick relay for each of said signals, a pick-up circuit for each of said stick relays controlled by a front contact of the first repeater relay for its signal and by a back contact of the traffic responsive means for the block for its signal, a stick circuit for each of said stick relays controlled by a back contact of the first repeater relay for its signal, a normal control circuit and a steady and a coded reverse control circuit for energizing the polarized and polar biased code following relays for each signal each controlled by a front contact of the traffic responsive means for the block for its signal, said normal control circuit for any given signal also controlled by front contacts of the first and second repeater relays for the next signal in advance of said given signal, said coded reverse control circuit for any given signal also controlled by a contact of the code transmitter and a back contact of the second repeater relay and a front contact of the first repeater relay for the next signal in advance, said steady reverse control circuit for any given signal also controlled by a back contact of the first repeater relay and a front contact of the directional stick relay for the next signal in advance, means controlled by front and normal contacts of each polarized relay for controlling its signal to display a steady green indication, means controlled by front and reverse contacts of each polarized relay and by a front contact of the polar biased code following relay for the same signal for controlling said same signal to display a flashing yellow or a steady yellow indication according as said relays are energized by coded or steady reverse current respectively, and means controlled by back contacts of the polarized and polar biased code following relays for the same signal for controlling said same signal to display a red indication.

THOMAS W. TIZZARD, Jr.

References Cited in the file of this patent

UNITED STATES PATENTS

| Number | Name | Date |
|---|---|---|
| 1,709,907 | Fereday | Apr. 23, 1929 |
| 2,076,930 | Young | Apr. 13, 1937 |
| 2,096,832 | Wenholz | Oct. 26, 1937 |
| 2,105,260 | Pflasterer | Jan. 11, 1938 |
| 2,133,306 | Pflasterer | Oct. 18, 1938 |
| 2,221,726 | Sorensen | Nov. 12, 1940 |